April 28, 1959  M. MAY  2,883,714
CART DOOR BUMPER
Filed April 27, 1956
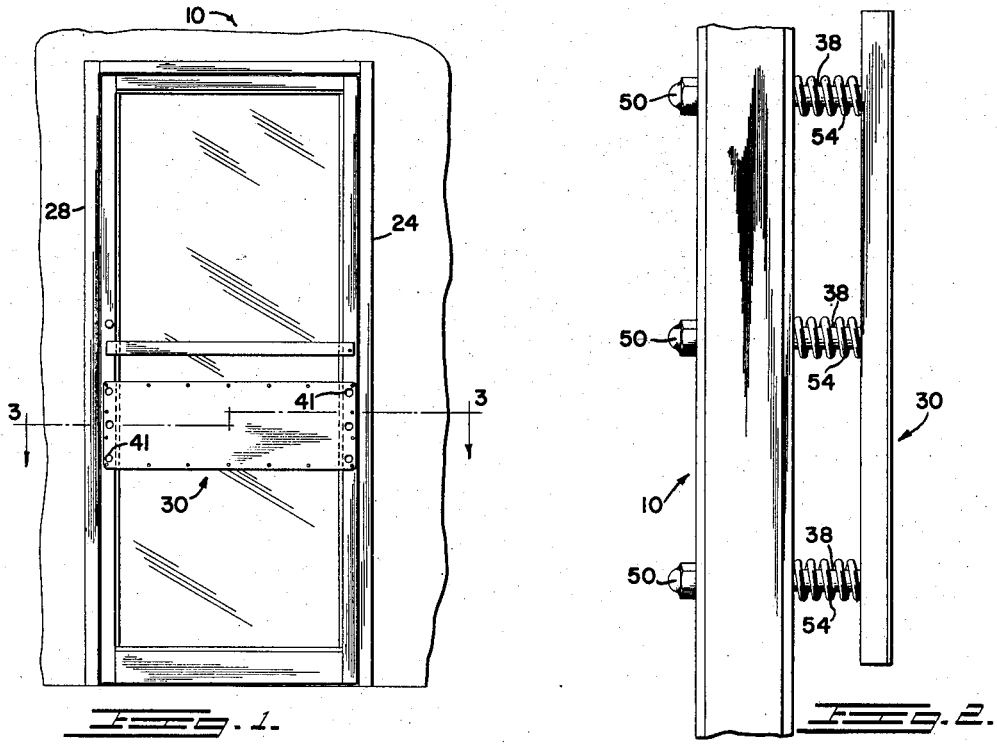
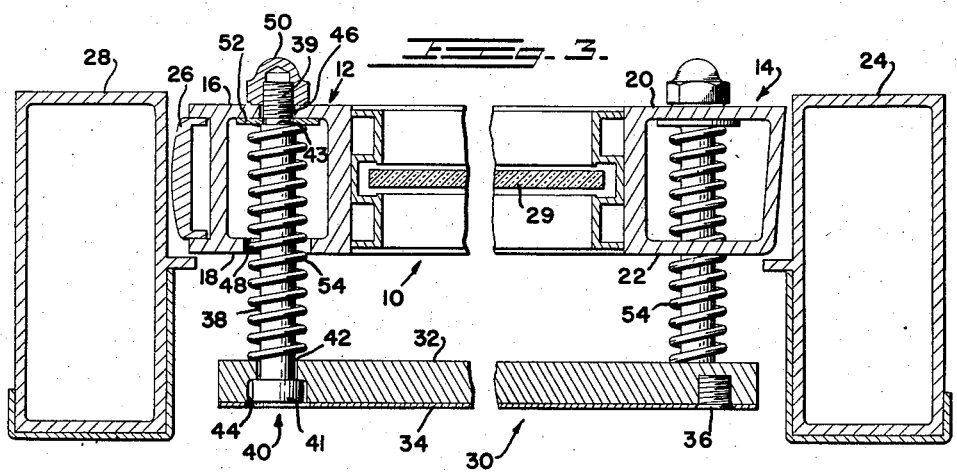
INVENTOR
MAURICE MAY
BY *Mead, Brown, Schuyler & Burridge*
ATTORNEYS

United States Patent Office 2,883,714
Patented Apr. 28, 1959

2,883,714
CART DOOR BUMPER

Maurice May, Atlanta, Ga., assignor to American Art Metals Company, Atlanta, Ga., a corporation of Delaware Application April 27, 1956, Serial No. 581,237

4 Claims. (Cl. 20—16)

This invention relates to door constructions and more particularly to a door including a bumper for absorbing the impact force of an object passing through the doorway, such as a market cart or the like.

With the widespread increase of grocery supermarkets throughout the country, the use of market carts which are propelled by the customers has greatly increased. At the end of the shopping operation, the market carts are usually pushed through a doorway of the market to the outside where the contents of the carts are loaded into the customers' automobiles. In pushing such market baskets or carts through the swinging doors which are usually provided in such markets, the doors are frequently damaged by the impact of the basket against the door and if the door includes a glass pane, the glass pane is sometimes subjected to undesirable impacts which may result in damage.

Accordingly, it is an object of this invention to provide a door construction particularly suitable for use in markets and the like, in which the door is protected against impact from objects passing through the doorway such as market carts and the like.

It is another object of this invention to provide a bumper for use with a door to prevent damage to the door caused by objects passing through the doorway.

In the achievement of these objectives, there is provided in accordance with an embodiment of this invention a door particularly suitable for use in a market or the like, including a relatively thick metal plate member mounted on the portion of the door which is normally engaged by the market cart, with the plate member being slidably movable on stud members toward the door against shock absorbing springs whereby the impact of the market cart is transferred to the door by the springs, serving to open the door, the bumper at the same time protecting the door against damage.

Further objects and advantages of the invention will become apparent from the following description taken in conjunction with the accompanying drawing in which—

Fig. 1 is a vertical elevation view of a door having a bumper member mounted thereon in accordance with the invention;

Fig. 2 is an enlarged side elevation view, partially broken away, of the bumper member mounted on the door; while Fig. 3 is a view in horizontal section along line 3—3 of Fig. 1.

Referring now to the drawing, there is shown in the embodiment of Fig. 1 a door generally indicated at 10 in which the frame portion is made of a metal such as aluminum. Door 10 includes a pair of oppositely disposed stiles generally indicated at 12 and 14, respectively, which are of hollow rectangular construction. Stile 12 includes oppositely disposed outside and inside wall portions 16 and 18, respectively. Stile 14 includes outside and inside wall portions 20 and 22, respectively. Door 10 is hinged to a door jamb 24 by hinge members (not shown) carried by door stile 14 and jamb 24. The opposite door stile 12 carries an astragal 26 which cooperates with a second door jamb 28. A glass pane 29 is supported between door stiles 12 and 14 and extends for a substantial portion of the height of the door.

A spring loaded bumper member generally indicated at 30 is mounted on door 10 in facing relation to the inside surface of the door. The bumper member is installed on the door at a height such that the bumper is properly positioned for engagement with the market cart. Bumper 30 comprises a relatively thick metal plate 32 formed of a light metal, preferably aluminum. A face plate 34 formed of a metal such as stainless steel is rigidly but removably attached to plate 32 by screws 36 or by other suitable means. A plurality of stud members 38 are mounted on door 10 to support bumper 30 for sliding movement toward or away from the facing surface of the door.

In the embodiment shown, three stud members 38 are vertically arranged on either side of the door to receive the bumper. Each stud member 38 has a threaded end 39 and an enlarged head portion 41 at its opposite end. Threaded end 39 is of slightly smaller diameter than the remaining portion of stud 38 which extends to head portion 41, the junction between threaded end portion 39 and the remaining portion of the stud defining a shoulder 43. Bumper 30 has a plurality of openings generally indicated at 40 for receiving stud members 38. Openings 40 include a portion 42 of slightly larger diameter than the diameter of stud members 30 and an enlarged countersunk portion 44 which receives the enlarged head portions 41 of studs 38.

The outside walls 16 and 20 of the respective door stiles 12 and 14 have a plurality of apertures 46 which receive the threaded end portions 39 of studs 38. The inside wall portions 18 and 22 of door stiles 12 and 14, respectively, are provided with apertures 48 through which the stud members pass. A threaded cap nut 50 is positioned in screw threaded engagement with each of the threaded ends 39 of studs 38. A washer 52 is positioned on each stud 38 at shoulder 43 and bears against the inside surface of the forward walls 16 and 20 of the respective door stiles 12 and 14.

A shock absorbing means in the form of a spring member 54 is positioned on each of the studs 30 between the forward surface of bumper 30 and washer 52. The spring index of each spring 54 is made such as to absorb the kinetic energy of a loaded market cart having an assumed average weight and moving at an assumed average velocity. Thus, for example, in a specific embodiment which has been constructed in accordance with the invention, the spring index of each spring was chosen to correspond to that required for a cart having an approximate weight of 35 pounds, moving at a velocity of 6 feet per second. It can be shown that the kinetic energy of such a cart is 235 inch-pounds. The springs 54 for this assumed condition should have a spring index of 25 pounds per inch.

In assembling bumper 30 onto door 10, studs 38 are first inserted through apertures 40 of the bumper until head portion 41 seats on the base of countersunk portion 44 of the respective apertures. Spring 54 is then positioned coaxially about the stud and the stud and surrounding spring are then inserted through apertures 48 in the respective inside walls 18 and 22 of stiles 12 and 14. The threaded ends 39 of the respective studs are then passed through apertures 46 of the outside or forward walls 16 and 20 of the respective stiles 12 and 14. Cap screw 50 is then screwed into position onto the threaded end 39 of each stud.

With the bumper member in position as shown in the drawings, a market cart striking the bumper 30 transfers its kinetic energy to the bumper and the energy is then transferred to the door through springs 54, the transferred kinetic energy serving to open the door. At the same time, the bumper prevents damage of any kind to the door or to the glass pane supported by the door.

It can be seen from the foregoing that the combination of the door and bumper member in accordance with the invention has great utility in supermarkets and the like and serves to prevent damage to the doors caused by the passage of loaded market carts through the doorway of the market.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. In combination, a door having parallel stiles and a pane member supported therebetween, a bumper member, means secured to said stiles supporting said bumper member for sliding movement with respect to said means toward said door, and shock absorber means disposed between said stiles and said bumper member.

2. In combination, a door having parallel stiles and a pane member supported between the stiles, each of said stiles having aligned bores therein of different diameters such that an abutment is provided at the interior of each stile, a bumper member, support means carried by said stiles passing through said aligned bores and supporting said bumper member for sliding movement on said support means toward said door, and spring means carried by said support means between said abutments and said bumper member and biasing said bumper member away from said pane.

3. A pair of parallel hollow door stiles each having an inner wall and an outer wall, a pane supported by and extending between said stiles, a bumper positioned adjacent to and substantially parallel to said pane, said bumper having one end portion positioned adjacent to and partially overlying the inner wall of one of said stiles and an opposite end portion positioned adjacent to and partially overlying the inner wall of the other of said stiles, each stile inner wall including a plurality of spaced apart apertures and each bumper end portion including a corresponding number of apertures aligned with the apertures of the stile inner wall to which the bumper end portion is adjacent, a stud extending through each stile inner wall aperture, each stud having an end connected to the stile outer wall with which it is associated and a head portion movably received in the aligned bumper aperture, and compressible shock absorbing means positioned between the bumper end portions and the stile outer walls, there being a shock absorber means positioned adjacent each stud and extending through the stile inner wall aperture through which the stud extends, said bumper being movable upon impact toward said pane and stiles to compress said shock absorbing means and transfer impact force to said door.

4. The combination as claimed in claim 3 wherein said compressible shock absorbing means comprises a spring surrounding said stud.

References Cited in the file of this patent
UNITED STATES PATENTS

| | | |
|---|---|---|
| 1,832,184 | Christen | Nov. 17, 1931 |
| 2,688,164 | Nelson | Sept. 7, 1954 |
| 2,715,037 | Maag | Aug. 9, 1955 |